United States Patent [19]

Stevenson et al.

[11] 4,245,760
[45] Jan. 20, 1981

[54] CONTAINER WITH BUILT-IN PROBE ASSEMBLY AND COUPLING HEAD ASSEMBLY THEREFOR

[75] Inventors: James S. Stevenson, Oakland; John J. Rodrigues, Orinda, both of Calif.

[73] Assignee: Terminator Products, Inc., Oakland, Calif.

[21] Appl. No.: 903,864

[22] Filed: May 8, 1978

[51] Int. Cl.³ .............................................. B67D 1/08
[52] U.S. Cl. ................................... 222/148; 222/464; 222/567; 222/483; 137/240; 137/637.1; 137/322
[58] Field of Search ............... 222/148, 153, 211, 464, 222/382, 478, 481, 481.5, 482–485, 487, 488, 501, 510, 512, 518, 541, 559, 400.7, 562, 567, 570; 220/270, 276; 137/637.1, 240, 241, 321–323; 141/89–91, 286, 302

[56] References Cited

U.S. PATENT DOCUMENTS

| 2,272,442 | 2/1942 | Tamminga | 222/153 |
| 2,629,614 | 2/1953 | Valentine | 222/400.7 |
| 2,684,182 | 7/1954 | Gey | 222/482 |
| 3,034,680 | 5/1962 | Steinberg | 220/276 |
| 3,120,908 | 2/1964 | Szajna et al. | 222/570 |
| 3,186,604 | 6/1965 | Pentesco | 222/501 |
| 3,272,402 | 9/1966 | Frangos | 222/488 |
| 3,281,007 | 10/1966 | Dorosz | 220/270 |
| 3,361,152 | 1/1968 | Akers | 222/400.7 |
| 3,361,307 | 1/1968 | Clare | 222/567 |
| 3,498,313 | 3/1970 | Belich | 222/400.7 |
| 3,680,745 | 8/1972 | Landen | 222/570 |
| 4,108,336 | 8/1978 | Anderson | 141/91 |

Primary Examiner—H. Grant Skaggs

[57] ABSTRACT

A container for holding and from which chemicals are capable of being selectively dispensed either by hand pouring or by means of a closed system, such container having a built-in probe assembly involving a recessed area in one wall, the recessed area having a central opening to receive a probe, and openings about said central opening, for discharge of the container contents when hand pouring, and a closure for sealing the recessed area for shipping of the container and its contents.

13 Claims, 10 Drawing Figures

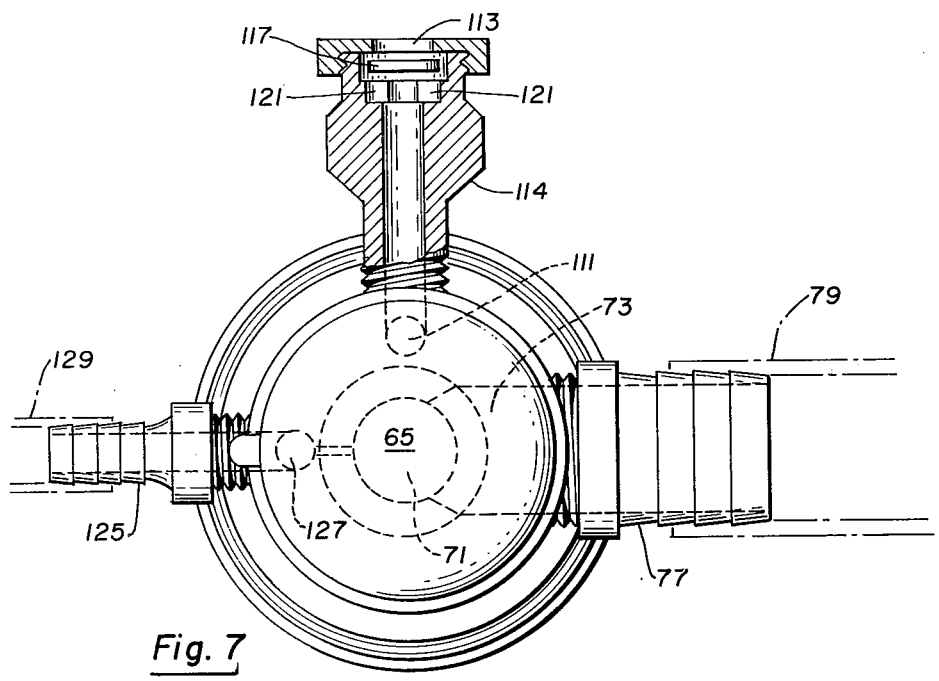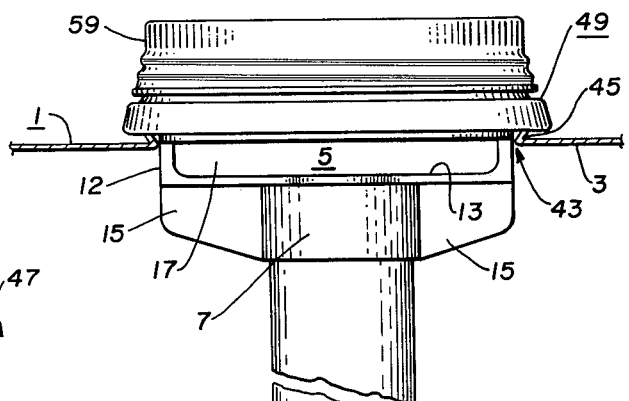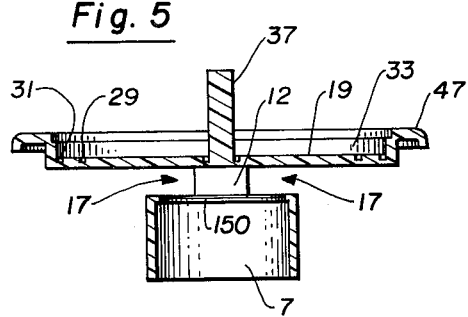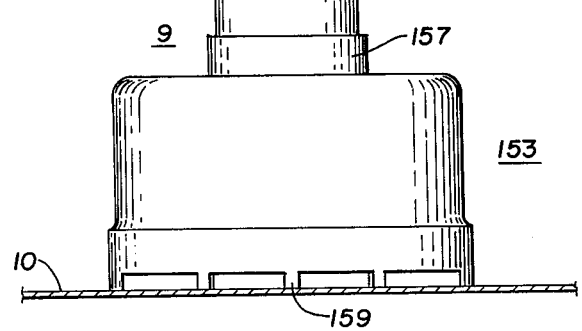

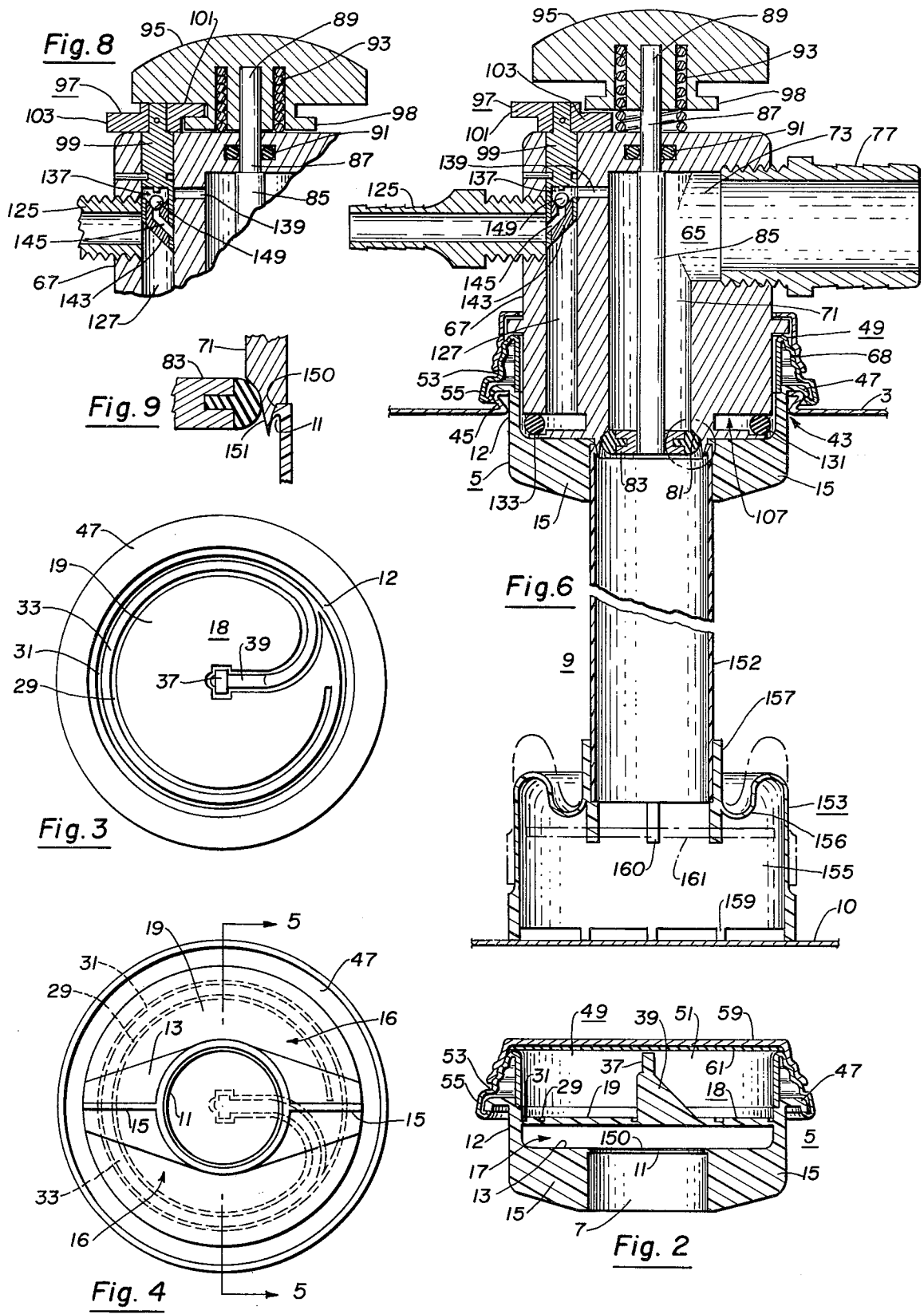

CONTAINER WITH BUILT-IN PROBE ASSEMBLY AND COUPLING HEAD ASSEMBLY THEREFOR

For safe dispensing of the contents by means of a closed system, a coupling head assembly installed in the recessed area provides a central connecting passageway to the probe and a peripheral groove connectible to atmosphere to preclude formation of a vacuum during withdrawal of liquid from the container.

Upon emptying of such container, the same peripheral groove can be coupled to a source of liquid to function as rinse openings for use in rinsing of the container. Improved spray is realized by installing an O-ring or equivalent in the peripheral groove.

Additional features provide for rinsing the hose lines of the closed system prior to disconnecting the coupling head assembly from the source container, and, also, a self-adjusting probe to compensate for variations in depth of the container.

THE INVENTION

The invention relates to the packaging, shipping and handling of liquid chemicals, and more particularly, to the handling and dispensing of such chemicals as pesticides or the like, from the original or source container in which such chemicals have been packaged and shipped.

While many of such chemicals are relatively safe to handle, certain of such chemicals are very hazardous, even to the extent of being deadly if one comes in contact therewith.

With respect to these other chemicals, more and more legislation is coming into existence, aimed at protecting an operator who must handle such chemicals, as in the preparation of solutions or mixtures thereof with a base liquid for spray purpose.

As a result, what have come to be known as closed systems have been developed, wherein, basically, a pump system including a mix tank for holding the base liquid and the resulting solution or mixture, has means for coupling to the source container for withdrawing the chemical therefrom and mixing it with the base liquid, and without the necessity of exposing the operator to contact with the chemicals involved.

Further, with regard to such hazardous chemicals, it is highly desirable, prior to the disposal of empty source containers, that such containers be thoroughly rinsed to remove any residual chemical or droplets clinging to wall surfaces, and such requirement has become and is becoming the subject of legislation in the various states.

Among the objects of our invention are:

(1) To provide a novel and improved container for chemicals which container lends itself readily to either hand pouring or for use in a closed system;

(2) To provide a novel and improved container of the foregoing type, which container can be produced very economically, so as not to materially affect the production cost thereof;

(3) To provide a novel and improved container for chemicals which lends itself readily to either hand pouring or for use in a closed system, and which can be fabricated with but a minimum of change from current practice;

(4) To provide a novel and improved container for chemicals which will enable increased safety in the handling of such chemicals, and which can be realized by a simple molded insertion of plastic into a wall of such container, and which molded insertion would be relatively inert to the chemicals it might come in contact with;

(5) To provide a novel and improved container for chemicals, and a cooperable coupling head assembly for enabling withdrawal of chemical from such container without the necessity of hand pouring;

(6) To provide a novel and improved container and closed system therefor, with provision for rinsing hose lines of said closed system prior to uncoupling of the said hose lines from said container;

(7) To provide a novel and improved container with a build-in probe;

(8) To provide a novel and improved self-adjustment probe for automatic length adjustment to compensate for variations in depth of a container in which it is installed.

Additional objects of our invention will be brought out in the following description of a preferred embodiment of the same, taken in conjunction with the accompanying drawings where:

FIG. 1 is a fragmentary view of a container embodying features of the present invention relating to a built-in probe assembly;

FIG. 2 is a view in section through a portion of the built-in probe assembly of FIG. 1;

FIG. 3 is a top plan view of a component of the assembly of FIG. 2;

FIG. 4 is an underside plan view of the component depicted in FIG. 3;

FIG. 5 is a view in section through the component of FIGS. 3 and 4, taken in the plane 5—5 of FIG. 4;

FIG. 6 is a fragmentary view in section depicting a coupling head assembly installed in the container of FIG. 1 following removal of the seal means incorporated therein;

FIG. 7 is a plan view looking down on the coupling head assembly of FIG. 5;

FIG. 8 is a fragmentary view of FIG. 6, depicting valve features of FIG. 6 performing in a different mode;

FIG. 9 is a view in section depicting an important detail of the structure of FIG. 6;

FIG. 10 is a fragmentary view of a self-adjusting probe employable in lieu of that disclosed in FIGS. 1 and 6.

Referring to the drawings for details of our invention in its preferred form, the same involves a container 1 which may be of any size, shape or material, capable of safely containing the chemicals to be packaged and shipped therein.

Such container will have a wall 3, preferably the top wall, formed or provided with a recessed area 5 have a short central passageway 7 extending through and downwardly therefrom, and of a diameter to snugly receive a probe 9 which extends to the bottom 10 of the container. A slight restriction at the upper end of this passageway 7 forms a shoulder 11 which functions as a stop to determine the limit of the probe into such passageway.

The recessed area may, in general, be described as involving a substantial cylindrical wall 12 and bottom 13, the central passageway extending through and down from the bottom and being reinforced by bracing ribs 15.

In addition to the central passageway 7, the recessed area, in the preferred form of the invention, is provided with large diametrically located bottom openings 16, one to either side of the central passageway 7 and extending part way up the side wall to provide continguous side wall openings 17, the area of the combined bottom and side openings being such as to satisfy one's requirement for hand pouring of the contents of the container, and may function as pour openings when pouring manually.

The provision of the pour openings leaves the bottom of the recessed area defining a cross piece incorporating the central passageway 7.

Spanning the recessed area above the pour openings, is a tear seal 18 in the form of a diaphragm 19 integrally united at its outer rim to the side wall 12 of the recessed area and provided with uniformly spaced tear lines 29, 31 forming a spiral tear strip 33 which starts at the center of the diaphragm and terminates along the periphery of the diaphragm, with only the outer tear line 31 completing a circle of facilitate complete removal of the diaphragm.

To initiate removal of the tear strip with a minimum of effort, the starting end is formed with an upstanding tab 37, rigidified by a triangular bracing rib 39, thus offering substantial leverage to pry from its anchorage, the starting end of the tear strip.

For installing the recessed area in the wall of the container, the container wall in which the recessed area is to be installed, is provided with an opening 43 bounded by an upstanding Z-shaped flange 45, while the recessed area is provided with an outward flange 47 adapted to fit over the wall opening flange 45.

A pour spout 49, preferably of metal with a cylindrical inner wall 51 set into the upper rim of the recessed area wall, and with an outer wall 53 which terminates in a downwardly directed flange 55 adapted to embrace the previously referred to flanges 45 and 47, is installed with its flange 55 in such embracing relationship, following which, the flanges are crimped together to permanently assemble the aforementioned components in sealing relationship to one another to become a permanent part of the container structure.

By providing the pour spout with an outside thread, it can receive a threaded cap 59 which, when provided with an interior sealing layer 61, may be tightened into sealing engagement with the spout.

When so assembled, the container is ready for shipment, the contents thereof being precluded from spilling by a double seal, namely, the tear seal 17 formed integrally with the wall of the recessed area, and the seal provided by the threaded cap on the pouring spout.

Upon removal of these seals, the contents of the container may be dispensed by hand pouring, as when the contents of the container are not of such hazardous character as to place the operator in jeopardy.

However, where the contents of the container may be of a hazardous character, thus requiring a closed system for the dispensing of such contents to avoid exposing the operator to the risk of contact with such chemical, a closed system connection is provided in the form of a coupling head assembly 65.

Such coupling head assembly includes a coupling head 67 which may be formed from a single block of suitable material adapted to slidably fit into the recessed area 5 until contact is made, and then secured by a collar or ring 68 threaded to the spout 49.

In alignment with the probe 9 is a passageway including a longitudinal portion 71 extending upwardly from the bottom and terminating short of the upper end of the coupling head, and a radial portion 73 extending from the longitudinally portion to the outer wall of the coupling head, where a hose fitting 77 is installed for attachment of a hose 79 (FIG. 7) for forming a closed system.

The lower end of the central portion is of slightly less diameter than the probe, with its lower end internally bevelled to provide a seat 81 for a main valve 83, the valve forming a part of a valve assembly, which includes a valve stem 85 that runs longitudinally of the central portion of the passageway and terminates in an end section 87 of reduced diameter, which slidably emerges through an opening in the upper end of the coupling head, to present an exposed or protruding end 89. This opening is sealed by an O-ring 91 installed in a recess about the stem as it passes through such opening.

The valve is normally urged to its closing position by a compression spring 93 installed about the exposed end of the valve stem, under sompression between the upper end of the coupling head and a knob 95 affixed to the exposed upper end of the stem. Thus the valve is a normally closed valve and one which may be urged to its open position by application of pressure to the knob 95.

It can be releasably maintained in such open position by means of a latch mechanism 97.

Such latch mechanism may involve a circular flange 98 at the lower end of the knob, in conjunction with a post 99 rotatably installed in the upper end of the coupling head and to which is affixed a pair of oppositely disposed arms 101, 103 of different elevations, the first arm 101 being adapted to be rotated into position above the flange when the knob is depressed to open the main valve 83, thus latching this valve in open condition.

By releasing the arm 101 to permit the normal closing of the main valve, the arm 103 is adapted to be rotated to a position under the flange to latch the main valve in its normally closed condition.

By rotating both arms out of the way of the flange, the latching means is rendered ineffective.

The valve assembly, thus described, enables open and shut control of the central passageway to the probe, through which the contents of the container are to be withdrawn.

To accomplish such withdrawal, necessitates intake of atmosphere into the container while the contents are being withdrawn, to preclude creation of a vacuum condition within the container.

Accordingly, such atmospheric intake is made possible by forming a peripheral groove 107 in the coupling head adjacent its lower end opposite the side wall portions 17 of the hand pour openings, and flow coupling this groove by means of an upwardly directed passageway 111 to a vent 113 through a fitting 114 (FIG. 7). This vent is automatically controlled by a disc valve 117 which is responsive to pevailing differential pressure, to either open or block the vent.

Such vent remains open when outside atmospheric pressure to one side of the disc valve exceeds the pressure to the other side thereof, the valve being restricted as to inward movement by a shoulder having radial grooves 121 extending beyond the periphery of the disc valve, whereby the valve, while in open condition, can never block communication with the passageway 111 to the peripheral groove 107.

Should the inside pressure against the disc valve exceed outside atmospheric pressure, this valve will engage the vent wall now functioning as a valve seat, and block the vent.

Following emptying of a container, provision is made in the coupling head assembly, for effectively rinsing the container to remove therefrom essentially, all vestige of residual chemical.

This we make possible by utilizing the peripheral spray groove as the equivalent of a large number of spray openings, as by flow coupling this groove to a rinse hose fitting 125 by, preferably, an independent passageway 127 (FIG. 7).

Water directed through a hose line 129 to the rinse hose fitting, will accordingly emerge from the peripheral groove and through the side wall portions 17 of the openings to engage the interior wall surfaces of the container, to remove residual chemical, the resulting solution being withdrawn via the probe and closed system, to be subsequently discharged, preferably to the mix tank holding the spray solution, and at a rate commensurate with the flow of rinse liquid to the source container.

More effective rinsing, however, is made possible by causing a greater fanning out or spraying of the rinse liquid at increased velocity, and this we accomplish through use of a ring 131 of resilient material such as an O-ring or the like, not as a seal, but to function in conjunction with proximate wall surfaces of the groove, as a torroidal spray nozzle.

Toward this end, the lower front edge of the groove is recessed to provide a seat 133 for the O-ring, and a proper size O-ring is then installed. If the side wall portions 17 of the pour openings expose the full height of the rinse groove, then a double spray pattern may be realized.

On the other hand, if the upper portion of the rinse groove is not exposed when viewed through the side wall portions of the hand pour openings, then spraying over the upper rim of the O-ring will be retarded and a single effective spray pattern of increased velocity will be realized from the rinse liquid exiting under the O-ring.

The cross-sectional curvature of the O-ring causes such liquid to spread somewhat in an upward direction, which is quite desirable in effecting rinsing of the roof of the container.

The rinse spray pattern may, if desired, be suitably altered by curving the seat surface on which the O-ring rests.

The O-ring, when of resilient material, can respond to increase in pressure of the rinse liquid to increase the effective rinse openings, whereby to increase spray volume.

An incidental advantage attributable to the recessed O-ring seat, is the fact that the O-ring is fixed in functional position and prevented from shifting in the peripheral groove when the coupling head assembly is not in use. This avoids the need to manually guide the O-ring when coupling the coupling head assembly to a container.

Important also in the use of closed systems for the handling of hazardous chemicals, is the ability to also rinse the coupling head assembly and the hose lines which at one time or another, handle the concentrated chemical. Such ability to rinse is built into the coupling head assembly in such manner as to assure full use of the rinse liquid for this purpose, when such rinsing is desired.

In the specific embodiment of this feature as illustrated, the post 99 which carries the latching arms 101, 103, is installed in axial alignment with the rinse passageway 127 and, in length, extends beyond the passage in the fitting 125, with the lower end cut on an angle of the order of 45 degrees or sufficiently to open the rinse passageway 127 directly to the passage through the fitting 125, when the post is rotated 180 degrees, from the position illustrated in FIG. 6 to the position shown in FIG. 8.

The lower end of post 99 is hollowed out to form a cavity 137 which is placed in flow communication with the passageway 71, 73 of the coupling head, by a connecting opening 139.

Inserted part way into the cavity is one end of an angular insert 143 with its exposed surface flush with the angled bottom end of the post, the upper or unoccupied portion of the cavity 137 being flow connectible to the fitting by a connecting passageway 145, when the longer side of the post faces the fitting as depicted in FIG. 6.

With the structure as just described, the lower portion of the post with the insert, becomes a rotatable valve, which, in one position, as per FIG. 6, can open communication from the rinse fitting 125 to the closed system hose lines via a cross connection including the opening 138 and the passageway 71, 73, while cutting off communication from the rinse fitting to the rinse passageway 127. In its 180 degree position as per FIG. 8, this valve opens communication from the rinse fitting to the rinse passageway 127 while blocking communication to the hose lines of the closed system.

It is important to note in this connection, that simultaneously with placing the rinse fitting in communication with the closed system hose lines for rinsing purposes, the main valve 83 will be automatically latched in closed position to preclude escape of the rinse liquid down the probe 9.

Likewise, when the rinse fitting is placed in communication with the rinse passageway 127 for rinsing of the container, the main valve 83 will automatically be latched in its open position to permit of withdrawal of the rinse liquid from the container for discharge to the mix tank.

As a safety precaution against accidental backflow of contaminated rinse liquid from the closed system hose lines to the source of rinse liquid, a ball check valve 149 may be placed in the cavity chamber 137 in relationship to a valve seat formed at the proximate end of the valve passageway 145.

It is important during withdrawal of chemical from the source container, that the probe be maintained sealed at its upper end to preclude intake of air which could render it non-functional. Also, during container rinsing, intake of rinse liquid into the probe at its upper end could render the rinsing function of little value.

To provide a simple but effective dependable seal, a small flexible fin 150 is formed along the upper portion of the cylinder surface of the shoulder and directed inwardly. A downwardly tapered flange 151 bordering the main valve seat and preferably of stiffer material than the fin, is adapted to pressure engage and flex the fin to effect a perfect seal then the coupling head assembly is installed.

Important, also, in connection with rinsing operations as they pertain to the rinsing of the source containers, is to leave as little as possible of the liquid in the source container prior to disposal of the container.

For practical purposes, the probe cannot terminate flush with the bottom of the container but must terminate a fraction of an inch from the bottom to allow ready entrance of the chemical being withdrawn. During exposure to forces encountered in handling and in shipment, as well as exposure to temperature changes, container depths may be caused to vary somewhat from the time of filling and sealing of the containers. With a built-in probe as proposed by the present invention, it becomes desirable to maintain a stable relationship between the probe and the container bottom despite such variations.

Accordingly we provide a probe which is self-adjusting as to length and will automatically adjust its length to compensate for such changes as they occur. This we basically accomplish by including in the probe at some point, a springy section capable of longitudinal expansion and contraction within limits, and installing the probe in physical contact with the container bottom under partial compression. Such probe, when installed under partial compression, will expand in response to an increase in depth of the container from whatever cause, and will contract in response to pressure developed, should the depth decrease from whatever cause. If the contact between the probe and bottom is by any of a number of known spacing means to assure flow to the probe, the spacing will be stably maintained despite subsequent variations in depth of the container.

In the embodiment of FIG. 6, the probe involves a tubular portion 152, and a foot portion 153 comprising a cylindrical wall 155 of greater diameter than the tubular portion, the two portions being connected by a spring wall section, the springy section in this embodiment constituting a corrugation 156 of a resilient material originating at one end along the upper edge of the wall 155 and carrying at its other end, a collar 157 capable of snugly receiving the tubular section.

Along the bottom edge of the cylindrical wall 155, spacer tabs 159 are provided to determine the desired spacing to be maintained between the probe and the container bottom. By installing the probe in sufficient pressure engagement with the container bottom, to effect a partial contraction of the probe, the desired spacing will be maintained despite variations in depth of the container.

In the probe just described, provision is made for installation of a filter, if desired. A plurality of tabs 160 depend from the collar 157. A filter disc 161 provided with suitably located openings to frictionally receive these tabs, may be installed thereon to perform its function. By making these tabs of adequate length, they will preclude any possibility of the probe being forced into flush engagement between the corrugation and the container bottom.

A second and radically different embodiment of a probe functioning on the same basic principle, is illustrated in FIG. 10 of the drawings. In this embodiment, the probe involves a pair of tubular portions 163, 165 of like diameter connected by a springy wall section 167 in the form of a laterally expanded bubble, preferably of thinner wall structure than the tubular portions.

Such probe may be formed either by joining two similarly molded longitudinally half sections, or by heating a tube of plastic in the area of the desired bubble and expanding the heated area by internal pressure. At one end of the probe, spacer tabs 169 may be formed.

Except for a few of the components such as the container 1, the pouring spout 53, threaded cap 59, collar 68, and spring 93, which are preferably of metal, all components may be molded, in whole or in part, of plastic.

While we have illustrated and described our invention in considerable detail, it should be apparent that the same is subject to alteration and modification without departing from the underlying principles involved and we accordingly do not desire to be limited in our protection to the specific details illustrated and described except as may be necessitated by the appended claims.

We claim:

1. In combination, a container for holding and from which may be dispensed, a liquid such as a pesticide or other chemicals, said container having a wall including a recessed area inwardly of said container and having an opening, a probe installed concentrically with said opening and extending into said container to substantially the bottom thereof, said recessed area having spaced ports therein about said opening and facing inwardly of said container, said spaced ports comprising pour openings for hand pouring of the contents of said container, and a coupling head assembly for coupling said container in a closed system, said coupling head assembly including a coupling head having at least one peripherally disposed rinse opening in one end portion and a rinse flow passageway to said rinse opening, said end portion being inserted into said recessed area with said rinse opening facing the interior of said container via said pour openings, said coupling head also having a flow passageway in communication with said probe, said latter flow passageway being independent of said rinse flow passageway, whereby said container may be coupled in a closed system to a hose line for withdrawing chemical from said container via said probe and then rinsed upon emptying of said container, by directing rinse liquid into said rinse flow passageway and through said rinse opening while withdrawing said rinse liquid from said container via said probe, said pour openings occupying, at least in part, the side wall of said recessed area, and said rinse opening being formed by a peripheral groove in said end portion of said coupling head and facing side wall portions of said hand pour openings, and further characterized by said rinse flow passageway in said coupling head extending from an external exposed wall of said coupling head to said peripheral groove, an O-ring in said peripheral groove and of a diameter permitting flow of rinse liquid therearound to issue as a fine rinse spray into said container.

2. A container in accordance with claim 1, characterized by said peripheral groove extending slightly above the side wall portions of said hand pour openings whereby said rinse liquid has free exit along the lower side only of said O-ring.

3. A container in accordance with claim 1, characterized by said coupling head probe communicating passageway including a portion extending longitudinally from the coupling end of said coupling head to a point short of the opposite end thereof and a lateral portion extending from the upper end of said longitudinal portion to the outer wall of said coupling head, and a hose fitting in the outer wall end of said lateral portion, a main valve at the coupling end of said longitudinal portion and having a valve stem extending axially of said longitudinal portion and through the opposite end of said coupling head, means connected to the exposed end of said valve stem to enable application of manual pressure to said stem, spring means between the proximate end of said coupling head and said pressure application means to normally lift said valve into closing position, whereby manual application of pressure to said manual pressure means will open said valve, and means for locking said valve in its open position.

4. A container in according with claim 3, characterized by said manual pressure means including a lateral flange, a post extending upward from the upper end of said coupling head, an arm carried by said post in substantially the normal plane of said flange and rotatable into position above said flange when said manual pressure means is depressed to open said main valve, whereby said main valve may be locked in open position.

5. A container in accordance with claim 4, characterized by means in said coupling head for selectively rinsing a hose line coupled to said hose fitting, comprising means for directing rinse liquid to said probe communication passageway and hose fitting while blocking flow to said rinse opening and locking said main valve in its closed position, whereby a hose line connected to said hose fitting may be rinsed of residual chemical.

6. A container in accordance with claim 5, characterized by said means for selectively rinsing such hose line while blocking flow to said rinse opening and locking said valve in its closed condition comprising a cross flow connection in said coupling head, between said rinse flow passageway and said flow passageway which communicates with said probe, means at the junction of said rinse flow passageway and said cross flow connection, selectively adjustable to either block said cross flow connection and open said rinse flow passageway, or open said cross flow connection and block said rinse flow passageway, and means for simultaneously locking said main valve in its closed condition when said cross flow connection is open.

7. A container for holding and from which may be dispensed, a liquid such as a pesticide or other chemicals, said container having a wall including a recessed area inwardly of said container and having an opening, a probe installed concentrically with said opening and extending into said container to substantially the bottom thereof, said recessed area having spaced ports therein about said opening and facing inwardly of said container, said spaced ports comprising pour openings for hand pouring of the contents of said container, and means for sealing said recessed area to preclude loss of contents of said container during shipment, said container having an upper wall with an opening therein bounded by an upstanding flange, and said recessed area including a side wall terminating in a peripheral flange adapted to extend over and rest on said opening flange to support said recessed area, and a pouring spout resting on said recessed area flange and having a flange overhanging said recessed area flange and upper wall opening flange, said flanges being crimped together to fixedly install said recessed area and pouring spout as component parts of said container.

8. A coupling head assembly for coupling to a container in a closed system, said coupling head assembly including a coupling head having an end portion adapted for insertion into an opening in such container, said end portion having a peripheral groove, and a rinse flow passageway in said coupling head and extending from an external exposed wall of said coupling head to said peripheral groove, and a differential pressure valve assembly on an exposed wall of said coupling head, said valve assembly being exposed at one end to atmospheric pressure and at its other end to prevailing pressure in said rinse flow passageway, said coupling head also having another flow passageway terminating at one end of said end portion, said latter flow passageway being independent of said rinse flow passageway, whereby such container may be coupled in a closed system to a hose line for withdrawing chemical from such container and then rinsed upon emptying of such container, by directing rinse liquid into such container via said rinse flow passageway while withdrawing said rinse liquid from such container via said other passageway.

9. A coupling head assembly in accordance with claim 8, characterized by an O-ring in said peripheral groove and of a diameter permitting flow of rinse liquid therearound to issue as a fine rinse spray into a container when installed therein.

10. A coupling head assembly in accordance with claim 9, characterized by said other passageway including a portion extending longitudinally from the coupling end of said coupling head to a point short of the opposite end thereof and a lateral portion extending from the upper end of said longitudinal portion to the outer wall of said coupling head, and a hose fitting in the outer wall end of said lateral portion, a main valve at the coupling end of said longitudinal portion and having a valve stem extending axially of said longitudinal portion and through the opposite end of said coupling head, means connected to the exposed end of said valve stem to enable application of manual pressure to said stem, spring means between the proximate end of said coupling head and said pressure application means to normally lift said valve into closing position, whereby manual application of pressure to said manual pressure means will open such valve, and means for locking said valve in its open position.

11. A coupling head assembly in accordance with claim 10, characterized by said means for locking said main valve in its open position including a lateral flange on said manual pressure means, a post extending upward from the upper end of said coupling head, an arm carried by said post in substantially the normal plane of said flange and rotatable into position above said flange when said manual pressure means is depressed to open said main valve, whereby said main valve may be locked in open position.

12. A coupling head assembly in accordance with claim 11, characterized by means for selectively rinsing such hose line, said means including manually operable means in said coupling head for directing rinse liquid to said other passageway and hose fitting, while blocking flow to said peripheral groove and locking said main valve in its closed position, whereby a hose line connected to said hose fitting may be rinsed of residual chemical.

13. A coupling head assembly in accordance with claim 12, characterized by said means for selectively rinsing such hose line while blocking flow to said peripheral groove and locking said valve in its closed condition, comprising a cross connection in said coupling head, between said rinse flow passageway and said other flow passageway, a valve at the junction of said rinse flow passageway and said cross flow connection, said valve being selectively adjustable to either block said cross flow connection and open said rinse flow passageway, or open said cross flow connection and block said rinse flow passageway, and means for simultaneously locking said main valve in its open condition when said rinse flow passageway is open, and locking said main valve in closed condition when said cross flow connection is open.

* * * * *